AUTOMATIC GAIN LEVEL STEPPING SYSTEM

Filed July 13, 1964

INVENTORS
KENNETH D. KROSSA
MICHAEL I. BEHR
BY
Christie, Parker & Hale
ATTORNEYS.

United States Patent Office 3,430,215

Patented Feb. 25, 1969

3,430,215

AUTOMATIC GAIN LEVEL STEPPING SYSTEM

Kenneth D. Krossa, Sierra Madre, and Michael I. Behr, Los Angeles, Calif., assignors to Burroughs Corporation, Detroit, Mich., a corporation of Michigan Filed July 13, 1964, Ser. No. 382,231

U.S. Cl. 340—174.1 10 Claims

Int. Cl. G11b 5/00, 5/06

ABSTRACT OF THE DISCLOSURE

Gain control for information storage and retrieval systems is disclosed. A storage device, such as a magnetic disk, presents readout signals of various amplitudes dependent upon the radial distance of particular storage tracks from the center of the disk. Such variable amplitude signals are beyond the signal handling range for one gain value in an amplifier. An amplifier is provided which is capable of assuming any one of several different distinct gain values, which gain values are preselected to afford proper amplification of signals recovered from distinct plural-track storage areas on the magnetic disk. A gain control device having a predetermined threshold level monitors the output of the amplifier and either maintains the initial gain setting in the amplifier, or alters the gain setting for the amplifier to another distinct gain value depending upon a comparison between the amplitude of amplified signals and the threshold level of the gain control device.

Figures 1, 2:
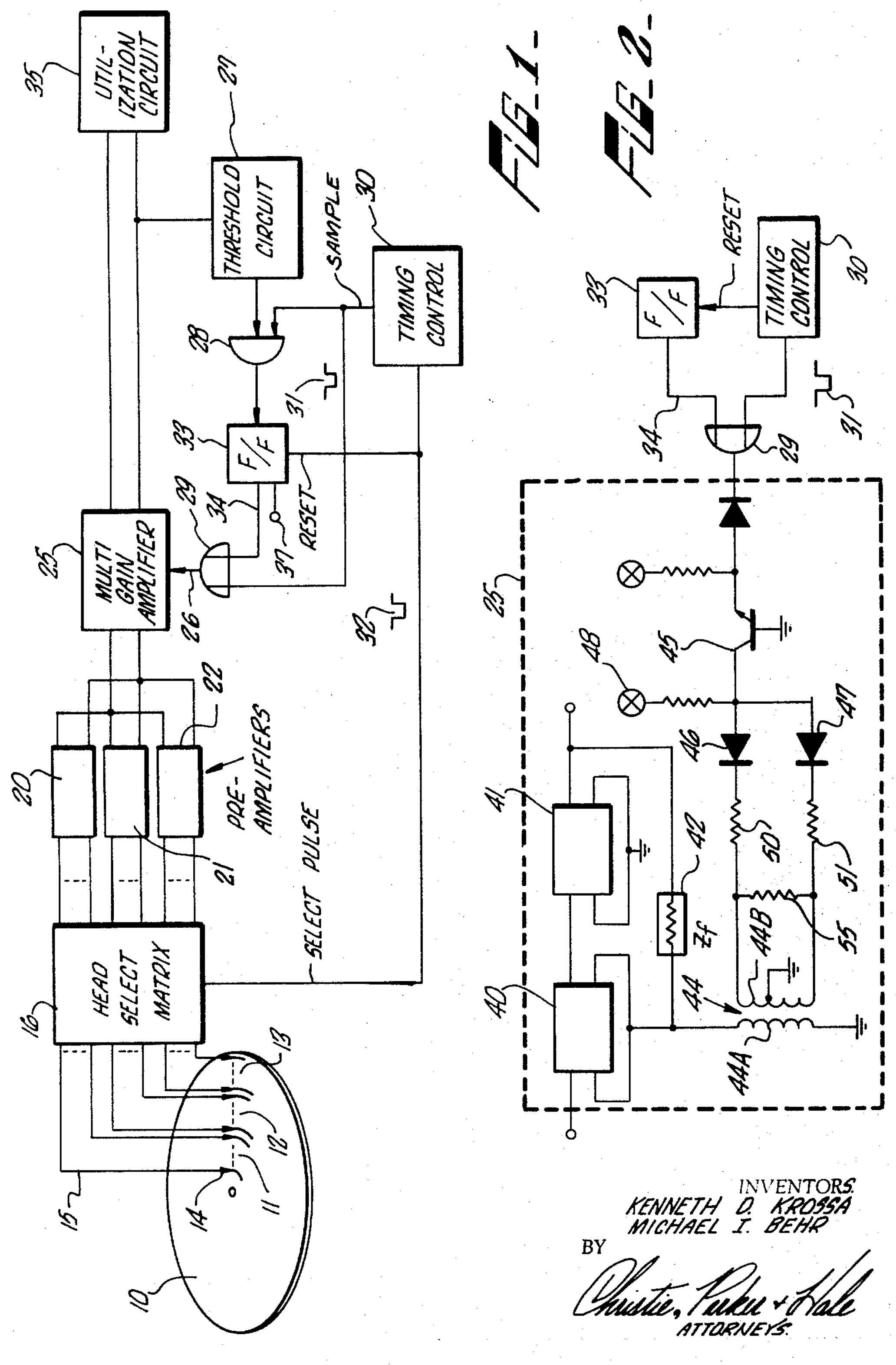

This invention relates to a gain control system, and more particularly to a gain control system for signals having a wide range of amplitudes and which establishes the gain level of a multi-gain amplifier at a value which is associated with, and proportional to, any random and representative signal which appears before the signals to be amplified.

Today's computer systems and magnetic storage and retrieval systems utilize information signals having amplitudes which vary over wide ranges. A relatively high amount of noise is inherent for such systems and results from many circuit factors which are difficult, if not impossible to eliminate. In any one system an overall signal to noise ratio may be determined by experimentation. Proper operation of such systems requires that the wide range of amplitudes of the information signals be separated from the noise of the system and recovered in the quickest and most economical manner.

The signal to noise ratio problem may best be appreciated by reference to one particular system such as a disk file, or similar information handling system. Noise in such a system will result from the inherent capacitive coupling in switching units, information leads, and information recovery circuits. This noise is approximately proportional to the amplitude of signals picked up by reading heads from the storage devices. Thus, if a large amplitude information signal is recovered there will also be a proportionately large noise signal associated with the information signal.

The above described noise problem is particularly serious in systems employing disk stores. In such stores the range of useable storage area starts near the center of the disk and extends out to near the disk's perimeter. Although these disk stores rotate at a constant speed, nevertheless the linear velocity of different portions of the disk is not constant. For example, the linear velocity under an information recovery head which is near the inside or center track of the disk is much slower than the linear velocity under an information recovery head at an outside track of the disk. Because the signal amplitudes induced in a recovery head are based on a rate of change of flux which in turn is directly proportional to the linear velocity of the disk under the head, information signals recovered at an outside head are of much greater amplitude than are information signals recovered at an inside head. The noise level of these signals varies in the same fashion as the amplitudes.

Another group of circuit factors which also influences the amplitude and the noise level of recovered signals are disk-to-head gap variations, reading head parameter variations, and magnetic surface undulations, or so called "run-out." The combination of these factors results in signals which vary over a wide range of amplitudes from the inside to the outside of the disk and have associated therewith varying amounts of noise such that the noise of the larger amplitude signals may exceed the amplitude of some of the smaller amplitude information signals.

Accordingly, prior art noise clipping circuits cannot be used in such systems because a clipper set to reject the maximum noise of a maximum amplitude information signal would reject minimum amplitude signals, and thus lose information and destroy the reliability of the system.

Another prior art approach is that of employing a sensing amplifier set at a selected gain for signals to be amplified, and after amplification these signals are stored for a parity or comparison check with a known and correct information signal. This approach eliminates the noise problem but is unattractive because it wastes time. In this prior art approach if an error is detected by the comparison between the amplified information and the known information, it is assumed to be the fault of the gain setting of the amplifier, and thus the gain setting is altered to a different value and the information is reread until all of the stored information is correctly recovered. This approach requires extensive circuit duplication and considerable time is lost because a full rotation of the disk is required for each rereading.

Another prior art approach is that of employing an automatic gain control amplifier to vary the gain in accordance with the amplitude of the signals recovered. This prior art approach also suffers from the drawback that considerable time is wasted. An automatic gain control circuit is a continuously operating scheme in which a large number of pulses must be sampled and compared with a reference in order to obtain a continuous feedback voltage that maintains proper gain adjustment for the amplifier. Accordingly, considerable time is wasted in achieving original gain stability. A further disadvantage of this prior art approach results from the fact that portions of the information on a disk file may consist of words having very few pulses present. Recovery of this type of information increases the time necessary for initial gain stability in an automatic gain control system, and also increases the possibility that an absence of pulses will prompt an increase in gain when none is required. Such an unwanted increase would cause considerable distortion in the information which is subsequently recovered.

The above disadvantages of the prior art are overcome by the gain control system of this invention. In the gain control system of this invention an amplifier is normally set at a first distinct gain setting for amplifying signals recovered from one of a number of storage zones. The amplifier is capable of assuming at least one other distinct gain settting for the purpose of amplifying signals recovered from the other storage zones. Signals are recovered from one of the zones and applied to the amplifier. A detector circuit is connected to the output of the amplifier and has a predetermined threshold amplitude level. A gain control device is connected to the amplifier for maintaining the first distinct gain setting or for establishing another distinct gain setting. Means are provided between the detector circuit and the gain control device for activating the gain control device only when the amplitude of an amplified signal varies by a predetermined amount from the threshold amplitude of the detector circuit.

The invention is described in more detail by reference to the accompanying drawings in which:

FIG. 1 is a block diagram of a gain control system including the principles of the present invention; and FIG. 2 is a combined block diagram and schematic circuit of a multi-gain amplifier of this invention.

In FIG. 1, a disk store 10 is shown provided with three different storage zones 11, 12 and 13 of numerous information tracks. The system depicted provides a fixed reading head 14 for each track, but as will become clear hereinafter, the gain control system of this invention would work equally well with a system requiring a single head per disk side which head is movable and adapted to read various portions of the disk. In either a single head per track or a single head per disk side system, the signals which are recovered from various portions of the disk are of such widely different amplitudes that they require different gain adjustments prior to their utilization by other circuitry. For convenience and ease of signal amplitude grouping, the radial distance of a disk is divided into three different zones 11, 12 and 13. Within each of these zones the signals recovered from an innermost and from an outermost track will be of relatively lower and higher amplitudes respectively. The amplitude ranges for each of these zones 11, 12 and 13 increases as a function of the linear velocity of the disk as described hereinbefore.

An initial gain adjustment for signals recovered from the zones 11, 12 and 13 is made by pre-amplifiers 20, 21 and 22. These pre-amplifiers are standard in the art and are adjusted so that amplifier 20 amplifiers more than amplifier 21, which in turn amplifies more than amplifier 22. These gain levels of amplifiers 20, 21 and 22 are based on the average signal of each zone 11, 12 and 13 so that the range of amplitude of the recovered signals from one side of the disk after pre-amplification, is inter-leaved and reduced considerably from the range of amplitude of the signals originally recovered from disk 10.

As described above, there is a single pre-amplifier for all of the information recovery heads of one zone of information tracks on the disk store 10. These information recovery heads are each center-tapped transformers which deliver positive and negative signals for each pulse of information read by a reading head. The output for each head thus comprises a pair of leads which are connected to the input of one of the pre-amplifiers by the head select matrix 16 under command of timing control circuit 30. The output of each of the pre-amplifiers also comprises a pair of leads which deliver the positive and negative signals recovered by a read head to the multi-gain amplifier 25. Although the range of amplitudes of the recovered signals is markedly reduced by the pre-amplification stage, nevertheless this range of signals amplitudes is still too large for handling at any single gain setting in amplifier 25 to handle.

The multi-gain amplifier of this invention is capable of handling the broad range of signal amplitudes presented by the pre-amplifier stage. A sampling operation prior to the appearance of the information which is to be recovered from the disk 10 is performed by timing control 30 which applies a control pulse 32 (i.e. a select and a flip-flop rest pulse) to the head select matrix 16, and flip-flop 33 respectively; and also applies a sample pulse 31 to OR gate 29 and AND gate 28. The control pulse 32 closes one path in head select matrix 16 to connect the desired information recovery head through its pre-amplifier to the multi-gain amplifier 25. Sample pulse 31, in accordance with one operational example of the principles of this invention, initially sets the multi-gain amplifier 25 in its lowest gain level.

Information recovered by the selected information head will vary in amplitude at various locations on the head's associated information track. In spite of such variation, however, any signal recovered from a selected track is representative of the amplitudes to be expected from such track. The multi-gain amplifier 25 initially set at its lowest gain level, amplifies this first, or sampling information pulse at that gain setting.

Threshold detector circuit 27 monitors the output of amplifier 25 and is adjusted, in a standard manner, so as to deliver an output to AND gate 28 only if the signal amplitude of an input signal thereto exceeds the predetermined threshold setting for detector circuit 27.

Sampling pulse 31 is applied by timing control source 30 to AND gate 28 and OR gate 29 for a sufficient time duration to assure that the above-mentioned representative comparison has been achieved by detector circuit 27. In addition to enabling AND gate 28, the sampling pulse 31, through OR gate 29, holds the multi-gain amplifier 25 in its low gain level. If the amplified signal at the output of amplifier 25 exceeds the threshold of detector circuit 27 the low gain level is proper and AND gate 28 is enabled. Flip-flop 33 which was previously reset by control pulse 32, is placed in the "one" state by the output from AND gate 28. This "one" state on lead 34, through OR gate 29, holds the multi-gain amplifier 25 in its low gain level throughout the information recovery period even after the sampling period has passed and timing control circuit 30 removes the sampling pulse 31 from gates 28 and 29. The multi-gain amplifier 25 is thus maintained in its low gain level, and information recovered from disk 10 is amplified and made available to utilization circuit 35 at this proper amplification level.

Timing control circuit 30, after the desired information has been recovered, applies another select and reset pulse 32 to the head select matrix 16 and flip-flop 33. For purposes of explanation, assume that in this subsequent operation the head select matrix is controlled to select one of the information recovery heads from information zone 11. At this inside portion of disk 10, as described previously, the signals recovered are of smaller amplitude than the signals from zones 12 or 13. The information read from the inside zone will be amplified by pre-amplifier 20 and applied to multi-gain amplifier 25. In this instance, the amplified output will not exceed the threshold level of detector circuit 27. Timing control circuit 30 during this sample period will again apply a sampling pulse 31 to AND gate 28 and OR gate 29, which in this instance will not satisfy the input conditions for AND gate 28, because there is no output from detector circuit 27. Flip-flop 33, as previously described, was reset to a "zero" state at lead 34 by the control, or reset, pulse 32 from timing control circuit 30. Accordingly, when timing control circuit 30 removes the enabling pulse 31 at the end of the sampling period, the OR gate 29 is no longer enabled, multi-gain amplifier 25 changes to a higher gain level in a manner more fully described hereinafter by reference to FIG. 2. This high gain level is held during this entire information recovery period, while information recovered from zone 11 is amplified at a higher gain level and is passed on to the utilization circuit 35.

Timing control circuit 30 does not apply another sample pulse 31 until the next head select operation, and accordingly, even if the recovered information were to exceed the threshold level of detector 27, AND gate 28 will not be enabled, and the flip-flop 33 holds its "zero" state on lead 34. This "zero" state, of course, maintains the multi-gain amplifier 25 in its high gain level. At the inception of a subsequent head select operation flip-flop 33 will be reset by timing control 30, and in the manner described hereinbefore, multi-gain amplifier 25 returns to its low gain level to await the next sample and information recovery operation.

In the circuit operation described hereinbefore, multi-gain amplifier 25 was initially set at its low gain level and the threshold amplitude of detector circuit 27 was chosen at a value such that flip-flop 33 was placed in a proper state to maintain the low gain level in amplifier 25 only if the threshold amplitude of detector circuit 27 was exceeded by the sampling signal. It should be understood, however, that another approach within the principles of this invention would be to connect lead 26 to the other output terminal 37 of flip-flop 33 thereby eliminating OR gate 29. Connected in this manner the reset operation by timing control circuit 30 would initially place the multi-gain amplifier 25 at its high gain level. In addition, a new amplitude level would be chosen for the threshold voltage of detector circuit 27 such that if the sampling pulse, after being amplified by the maximum gain of amplifier 25, exceeded this new threshold level, then gate 28 would pulse flip-flop 33 and thereby change its state. This change in state of flip-flop 33 would, in a manner similar to that described hereinbefore, reduce the gain of amplifier 25. If the sampling pulse, however, did not exceed the threshold of detector circuit 27, multi-gain amplifier 25 would properly remain in its high gain setting during the entire information recovery period.

A combined block diagram and circuit schematic for the multi-gain amplifier 25 is shown in FIG. 2. The amplifier and the gain control circuit of FIG. 2 is fully described and claimed in a patent application filed by myself, Kenneth D. Krossa, as co-inventor with Wuu Lin, having Ser. No. 382,291, filed July 13, 1964 concurrently with the present application, and assigned to the same assignee, now issued as U.S. Patent No. 3,327,236.

In FIG. 2, a two stage multi-gain amplifier 25 is represented as including blocks 40 and 41, and may be of the type known to the art and described, for example, in "Transistor Electronics," chapter 8, pages 204 through 233, in particular at FIGS. 7–8, page 223. A feedback resistor 42 is connected between the output of amplifier 41 and the gain control lead of the first amplifier 40. The amplifiers 40 and 41 may advantageously be transistor amplifiers which are biased for class A operation, in which the transistor is always conducting in the linear region of the collector characteristics, and in which the bias currents and the signal to be amplified are of proper magnitude to achieve this class A operation. If, for example, the amplifiers 40 and 41 comprise grounded-emitter transistors, the gain of the amplifier circuit 25, as is well known, is approximately expressed by the ratio of the feedback impedance $Z_f$, divided by the emitter impedance.

The emitter impedance is that impedance reflected into the primary winding 44A of transformer 44 by the center tapped transformer secondary 44B. The value of the impedance which is to be reflected to primary 44A in turn depends upon the conductive condition of transistor 45. If transistor 45 is in a non-conductive condition the diodes 46 and 47 are forward-biased and conduct current from source 48. Operating in this fashion resistors 50 and 51 are in parallel with resistor 55. The reflected impedance is thus a small value, and the overall gain of the amplifier is a correspondingly high gain.

On the other hand, if transistor 45 is in a conductive condition then diodes 46 and 47 are back-biased. In this instance the reflected impedance is the higher value of resistor 55 alone, and the gain of the transistor is thus at a low level.

In accordance with the above described operation, the multi-gain amplifier 25 of FIG. 2 is normally set in a low gain level. Accordingly, transistor 45 is normally conductive so that a high value of impedance is reflected to the gain control lead of the amplifier circuit. Transistor 45 will be conductive whenever sample pulse 31 is applied to OR gate 29 by timing control 30, or when the flip-flop 33 is in the "one" state. As described hereinbefore, whenever the amplified pulse exceeds the predetermined threshold level of detector circuit 27, the flip-flop 33 is set in a "one" state at lead 34, and will hold that state during an entire information recovery period.

On the other hand, if the amplified pulse does not, in a subsequent sample period, exceed the threshold of detector circuit 27, flip-flop 33, in the operation described above assumes a "zero" state at lead 34 and transistor 45 becomes non-conductive. Diodes 46 and 47 are forward-biased and a lower impedance is reflected to the primary 44A of transformer 44. This low impedance increases the gain of the circuit.

Multi-gain amplifier 25 has been described as limited to two different gain settings. It should be clearly understood, however, that this number of gain settings is not to be taken as limiting this invention, because numerous different gain settings are possible. For example, more than one threshold detector and gain control flip-flop could be employed along with different impedances, transistors and diodes in the amplifier impedance control circuit to achieve numerous other settings. Reference to the above-identified patent by Krossa et al., explains in greater detail other configurations for the amplifier gain controlling impedance circuit, which could advantageously be employed in this invention. It is to be further understood that the above described arrangements are illustrative of the principles of this invention. Numerous other arrangements may be devised by those skilled in the art without departing from the spirit and scope of this invention.

What is claimed is:

1. In an information system having a magnetic recording disk with a plurality of concentric circular information storage tracks assigned in at least two plural-track storage zones with the average recovered signal amplitude for all tracks in each zone varying from zone-to-zone, a gain control system comprising:
   an amplifier normally set at a first distinct gain setting proper for amplifying signals recovered from one of said storage zones and capable of assuming at least one other distinct gain setting proper for amplifying signals recovered from said other storage zones;
   means for recovering signals from one of said zones and applying said recovered signals to said amplifier;
   a detector circuit connected to the output of said amplifier and having a predetermined threshold amplitude level;
   a gain control device connected to said amplifier and operative for maintaining said first distinct gain setting for said amplifier or for establishing another distinct gain setting therefor; and
   means connected between said detector circuit and said gain control device for activating said gain control device only when the amplitude of an amplified signar varies by a predetermined amount from said threshold amplitude of said detector circuit.

2. A gain control system as defined in claim 1 wherein said connecting means comprises, a bistable multivibrator circuit having an output connected to said gain control device and a logic gate connected between said detector circuit and an input for said multivibrator circuit, and further comprises a timing pulse control means for assigning to said gain control system a sampling time period and an information recovery time period, and pulse applying means for said timing control means connected to a set lead for said multivibrator for initially setting it in one state during said sampling time period and further connected to said logic gate for setting the multivibrator in another state during said information recovery time period if an amplified signal during said sampling period exceeds the predetermined threshold amplitude level of said detector circuit.

3. A gain control system including reading heads for recovering from a storage device information signals which have widely varying amplitudes depending upon the storage location of such signals and comprising, an amplifier connected to said reading heads and having a gain control circuit capable of establishing for said amplifier several different distinct gain values approximately inversely proportional to the amplitude of signals from said different storage locations, a detector circuit connected to the output of said amplifier and having a predetermined threshold amplitude level, a timing control source, means connecting said timing control source to said reading heads and to said gain control circuit for substantially simultaneously selecting one of said reading heads and setting said amplifier at one distinct gain value, and a multi-state device connected to said gain control circuit and responsive to an output signal from said detector circuit for establishing said amplifier at the distinct gain value associated with said storage location.

4. A gain control system in accordance with claim 3 wherein said storage device comprises:

a magnetic memory disk having on one side thereof a plurality of concentric circular storage tracks arranged in concentric storage locations defined by multitrack groups of adjacent storage tracks.

5. A gain control system in accordance with claim 4 wherein said amplifier further comprises:

a preamplification stage connected to said reading heads and comprising preamplification means for each storage location adjusted to reduce the range of amplitude variation of signals recovered from different tracks within each one of said concentric storage locations.

6. A gain control system in accordance with claim 5 wherein said reading heads comprises a head for each of said storage tracks, and further comprising:

a random access means associated with said connecting means for selectively activating, during a given information recovery interval, reading heads of one storage location only.

7. A gain control system for handling signals recovered from a magnetic storage disk having a plurality of circular storage tracks arranged in at least two concentric plural-track storage zones wherein the amplitude of signals recovered from the disk vary from one concentric zone to another, said gain control system comprising:

an amplifier having a gain function dependent upon the resistance appearing at a gain control terminal;

means connecting an input of said amplifier to said signal source and an output to a utilization circuit;

gain control means having a plurality of separate and distinct resistance values each associated with the amplification required for signals recovered from each of said storage zones;

a monitoring circuit connected to the amplifier output and including means comparing the amplitude of an amplified signal recovered from one of said storage zones with a predetermined amplitude reference established at said monitoring circuit for producing an output indicative of a difference in said compared amplitudes; and means connected between said monitoring circuit and said gain control means and responsive to said comparison output for establishing at said gain control terminal the distinct resistance value associated with said one storage zone.

8. A gain control system including reading heads for recovering from a storage device information signals which have widely varying amplitudes depending upon the storage location of such signals and comprising; a preamplification stage connected to said reading heads and having a preamplifier for each of said storage locations adjusted to reduce the range of amplitude variation of signals recovered from different locations of said storage device, an amplifier connected to said preamplification stage and having a gain control circuit capable of establishing for said amplifier a high or a low gain state, a detector circuit connected to the output of said amplifier and having a predetermined threshold amplitude level, a timing control source defining a sampling period and an information recovery period, means connecting said timing control source to said reading heads and said gain control circuit for substantially simultaneously selecting one of said reading heads and for setting said amplifier at a low gain value during the sampling period, and a multistate device connected to said gain contral circuit and responsive to said detector circuit for holding the gain of said amplifier at its low gain setting during the information recovery period when a sampled signal is less than said detector level and for setting said amplifier at its high gain setting during the information recovery period when a sampled signal exceeds said predetermined threshold amplitude.

9. A gain control system for a source of signals which have various amplitudes and which include a sampling signal and information signals, said system comprising: an amplifier connected to said signal source, a pulse responsive gain control circuit for said amplifier for selectively establishing said amplifier in a high or a low gain state, pulse applying means connected to said gain control circuit for initially setting said amplifier in its low gain state during an interval for recovering said sampling signal from said signal source, a bistable device connected to said pulse applying means and said gain control circuit and responsive to said pulse applying means during said sampling interval for assuming a state capable of setting said amplifier in its high gain state after said sampling period, a detector circuit connected to the output of said amplifier and having a predetermined threshold amplitude level, and means connected between said detector circuit and said bistable device for altering the state of said bistable device when said sampling signal exceeds said predetermined threshold amplitude whereby said amplifier is maintained at its low gain setting for recovery of said information signals from said signal source.

10. A gain control system for recovering from a storage device information signals which have widely varying amplitudes depending upon the storage location of such signals, said gain control system comprising; information recovery circuits for said storage device; an amplifier having an input circuit connected to said information recovery circuits, an output circuit connected to a utilization circuit, and a gain control circuit capable of establishing several distinct gain settings for said amplifier; a detector circuit having a predetermined threshold amplitude level, and having its input connected to the output circuit of said amplifier and its output connected to a logic gate; timing pulse control means for selecting one of said information recovery circuits and for assigning to said gain control system a sampling time period and an information recovery time period; means connecting said timing control means to said logic gate and to said gain control circuit for applying during said sampling time period a gain setting pulse to said amplifier and an enabling pulse to said logic gate; a bistable device connected between said logic gate and said amplifier gain control circuit and operative during said sampling time period upon coincidence of an amplified signal exceeding said threshold level of said detector circuit and said enabling pulse for thereafter establishing and maintaining a different gain setting in said amplifier during said information recovery time period.

References Cited

UNITED STATES PATENTS

| | | | |
|---|---|---|---|
| 3,030,022 | 4/1962 | Gittleman | 330—86 |
| 3,159,787 | 12/1964 | Sexton et al. | 330—86 |
| 2,239,042 | 4/1941 | Kleber et al. | 179—100.4 |
| 2,320,429 | 6/1943 | Hasbrouckj | 179—100.4 |
| 2,528,457 | 10/1950 | Stone et al. | 179—100.4 |
| 2,807,797 | 9/1957 | Shoemaker | 340—174.1 |
| 3,017,616 | 1/1962 | Runyan | 179—100.2 |
| 3,084,337 | 4/1963 | Willard | 179—100.2 |
| 3,223,937 | 12/1965 | McDonald | 330—86 X |

TERRELL W. FEARS, *Primary Examiner.*

VINCENT P. CANNEY, *Assistant Examiner.*

U.S. Cl. X.R.

179—100.4

PO-1050
(5/69)

UNITED STATES PATENT OFFICE
CERTIFICATE OF CORRECTION

Patent No. 3,430,215 Dated February 25, 1969

Inventor(s) K.D. Krossa et al

It is certified that error appears in the above-identified patent and that said Letters Patent are hereby corrected as shown below:

Col. 3, line 34, change "amplifiers" to --amplifies--;
Col. 3, line 65, change "rest" to --reset--;
Col. 5, line 33, change "FIGS.7-8" to --FIG. 8-7--;
Col. 6, lines 47-48, change "signar" to --signal--.

SIGNED AND
SEALED
MAR 10 1970

(SEAL)
Attest:

Edward M. Fletcher, Jr.
Attesting Officer

WILLIAM E. SCHUYLER, JR.
Commissioner of Patents